(12) United States Patent
Drui et al.

(10) Patent No.: US 11,275,025 B2
(45) Date of Patent: Mar. 15, 2022

(54) TURBIDITY SENSOR

(71) Applicants: BUERKERT WERKE GMBH & CO. KG, Ingelfingen (DE); BUERKERT S.A.S., Triembach-au-Val (FR)

(72) Inventors: Manon Drui, Ingelfingen (DE); Vincent Risch, Ingelfingen (DE)

(73) Assignees: BUERKERT WERKE GMBH & CO. KG; BUERKERT S.A.S.

( * ) Notice: Subject to any disclaimer, the term of this patent is extended or adjusted under 35 U.S.C. 154(b) by 0 days.

(21) Appl. No.: 17/135,513

(22) Filed: Dec. 28, 2020

(65) Prior Publication Data
US 2021/0199580 A1    Jul. 1, 2021

(30) Foreign Application Priority Data
Dec. 27, 2019  (FR) ........................................ 1915657

(51) Int. Cl.
*G01N 21/59* (2006.01)
*G01N 1/28* (2006.01)
*G01N 21/03* (2006.01)

(52) U.S. Cl.
CPC ............... *G01N 21/59* (2013.01); *G01N 1/28* (2013.01); *G01N 21/03* (2013.01)

(58) Field of Classification Search
CPC .......... G01N 21/59; G01N 1/28; G01N 21/03; G01N 2021/158; G01N 21/53; G01N 21/51; G01N 21/47
USPC ....................................................... 356/440
See application file for complete search history.

(56) References Cited

U.S. PATENT DOCUMENTS

| | | | | |
|---|---|---|---|---|
| 5,059,811 | A * | 10/1991 | King | G01N 21/532 250/573 |
| 5,140,168 | A * | 8/1992 | King | G01N 21/532 250/575 |
| 5,331,177 | A * | 7/1994 | Kubisiak | D06F 34/22 250/574 |
| 5,446,544 | A * | 8/1995 | Beers | G01N 21/53 356/339 |
| 9,228,942 | B2 * | 1/2016 | Suzuki | G01N 21/51 |
| 10,935,490 | B2 * | 3/2021 | Langhoff | G01N 21/51 |
| 2009/0009770 | A1 * | 1/2009 | Connelly | G01N 21/15 356/440 |
| 2010/0296095 | A1 * | 11/2010 | Hong | G01N 21/534 356/436 |
| 2011/0043807 | A1 * | 2/2011 | Andelic | G01N 21/49 356/441 |
| 2012/0312973 | A1 | 12/2012 | D'Costa et al. | 250/239 |
| 2017/0307525 | A1 * | 10/2017 | Langhoff | G01N 21/51 |

FOREIGN PATENT DOCUMENTS

JP      2017-223560      12/2017      ............. G01N 15/06

* cited by examiner

*Primary Examiner* — Roy M Punnoose
(74) *Attorney, Agent, or Firm* — Hayes Soloway P.C.

(57) ABSTRACT

A turbidity sensor has a housing, a cuvette for a sample medium, a lighting source, a light sensor, a drying agent and a chamber system. The chamber system includes a central receiving space in which the cuvette is arranged, a lighting chamber adjoined by the lighting source, at least one sensor chamber adjoined by the light sensor, and a drying chamber in which the drying agent is arranged. The lighting chamber, the at least one sensor chamber and the drying chamber are each fluidically connected to the central receiving space. The chamber system is here configured as a passive, pump-free system.

10 Claims, 3 Drawing Sheets

TURBIDITY SENSOR

Figure 1:
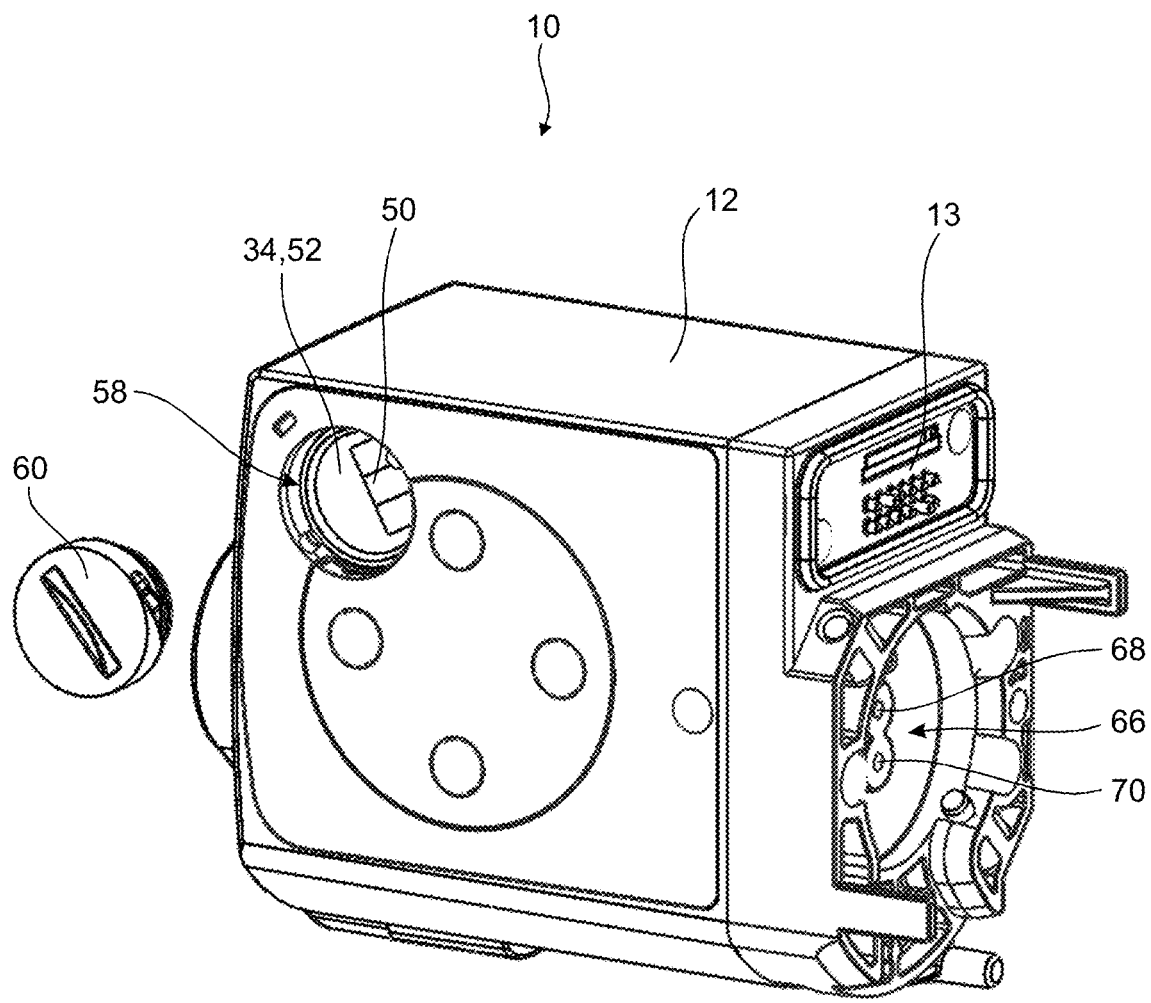

The invention relates to a turbidity sensor having a housing, a cuvette for a sample medium, a lighting means, a light sensor, a drying agent and a chamber system.

Turbidity sensors for determining the opacity or turbidity of a sample medium are known.

For this purpose, the sample medium is illuminated with a defined light intensity and, depending on the measurement setup, the transmitted and/or reflected light is measured using light sensors. The air humidity has a significant influence on the quality of the measurement, since glass surfaces in the optical path can fog up and thus falsify the measurement. To keep the air humidity in the optical path low, turbidity sensors therefore usually have a drying cycle. Here, the air is circulated by a pump in a chamber system which comprises the optical path and is guided past a drying agent which removes humidity from the air and thus lowers the air humidity.

However, the drying cycle requires valuable installation space. Furthermore, energy is required to operate the pump.

The object of the invention is to provide a turbidity sensor which has a compact design and can be operated in an energy-saving manner.

To achieve the object, a turbidity sensor having a housing, a cuvette for a sample medium, an lighting means, a light sensor, a drying agent and a chamber system is provided. The chamber system comprises a central receiving space in which the cuvette is arranged, an lighting chamber adjoined by the lighting means, at least one sensor chamber adjoined by the light sensor, and a drying chamber in which the drying agent is arranged. The lighting chamber, the at least one sensor chamber and the drying chamber are each fluidically connected to the central receiving space and thus to one another via the latter. The chamber system is configured as a passive, pump-free system in which, during operation, an exchange of air between the chambers takes place exclusively passively, in particular by convection. In other words, the turbidity sensor does not have any means, such as a pump, for actively circulating the air in the chamber system.

Within the meaning of the invention, a drying agent is a substance which has the property of binding humidity from the air or removing humidity from the air.

It has been recognized that with such a passive air drying system, the air humidity in the chamber system can be kept sufficiently low. Surprisingly, the volume of the chamber system can be reduced by omitting a circulation system to such an extent that the mere presence of the drying agent in the chamber system effectively reduces the air humidity in the entire chamber system, even without actively circulating the air in the chamber system. In this way, the turbidity sensor can be designed particularly compact. Furthermore, the turbidity sensor is particularly energy-saving, as no energy needs to be expended to actively circulate the air in the chamber system.

In particular, the chamber system has only one single drying chamber comprising the drying agent. This means that the drying agent is arranged in only one location in the chamber system.

According to one embodiment, the lighting chamber, the at least one sensor chamber and the drying chamber are each directly fluidically connected to the central receiving space via a separate connecting duct. Thus, the drying chamber is respectively directly connected to the lighting chamber and the at least one sensor chamber via the receiving space, so that the corresponding connecting path from the lighting chamber and the at least one sensor chamber to the drying chamber is respectively particularly short. In this way, it can be ensured that the drying agent effectively keeps the air humidity low or reduces it in the entire optical path. The optical path comprises the lighting chamber, the at least one sensor chamber and the central receiving space, as well as the corresponding connecting ducts therebetween.

According to a further embodiment, the drying chamber is fluidically connected to the central receiving space via a single connecting duct, as a result of which the chamber system is particularly simple in design and the turbidity sensor can be manufactured at particularly low cost.

Here, the connecting duct which fluidically connects the drying chamber to the central receiving space can form the generally single fluidic connection to the drying chamber. This makes the volume of the chamber system particularly small, so that the air humidity in the chamber system can be reliably kept at a level that does not significantly impair turbidity measurements by means of the passive air drying system.

Furthermore, it may be provided that an annular intermediate space is formed in the central receiving space, which annularly surrounds the cuvette and via which the lighting chamber and the at least one sensor chamber are fluidically connected to the drying chamber. The annular intermediate space ensures a particularly homogeneous distribution of humidity in the chamber system, as a result of which the drying agent can particularly effectively remove air humidity from the air.

In one embodiment, the central receiving space has a longitudinal axis, a plane which is perpendicular to the longitudinal axis intersecting the central receiving space, the lighting chamber, the at least one sensor chamber and the drying chamber. In this way, the chambers and the receptacle are arranged in a common plane and are thus arranged in a particularly space-saving manner.

In a further embodiment, the chamber system has a second sensor chamber which includes a second light sensor and which is fluidically connected to the central receiving space. The measurement accuracy of the turbidity sensor can be improved by the second light sensor.

In particular, one light sensor may be provided here for transmitted light measurements, in which the attenuation of the light radiation passing through the sample medium is measured, while the other light sensor is provided for scattered light measurements, in which the scattered light emitted laterally by the sample medium is measured.

It is advantageous if the chambers, preferably the entire volume of the chamber system, are closed in an airtight manner to the outside in the housing so that an air exchange into the chamber system or out of the chamber system is effectively prevented. This ensures that no humidity, or almost no humidity, can enter the chamber system from outside the turbidity sensor via the air. This reduces the amount of humidity that the drying agent must absorb to provide a low air humidity atmosphere in the chamber system. Thus, the drying agent can have a particularly long service life. Furthermore, only a small amount of drying agent is therefore required, so that the drying chamber and thus the turbidity sensor may have a particularly compact design.

In order to be able to replace the drying agent with little effort, the housing may have a maintenance access to the drying chamber, which is configured for replacing the drying agent in the drying chamber.

The turbidity sensor preferably has a closure element by means of which the maintenance access is adapted to be closed, in particular in an airtight manner, in order to reliably prevent an exchange of air between the chamber system and the environment of the turbidity sensor.

Furthermore, it may be provided that the turbidity sensor has a temperature sensor and/or an air humidity sensor which are adjacent to the drying chamber and/or are accommodated at least in sections in the drying chamber. In this way, the temperature and/or the air humidity can be reliably determined and monitored directly in the drying chamber, in particular to determine the point in time at which the drying agent must be replaced.

Figure 2:
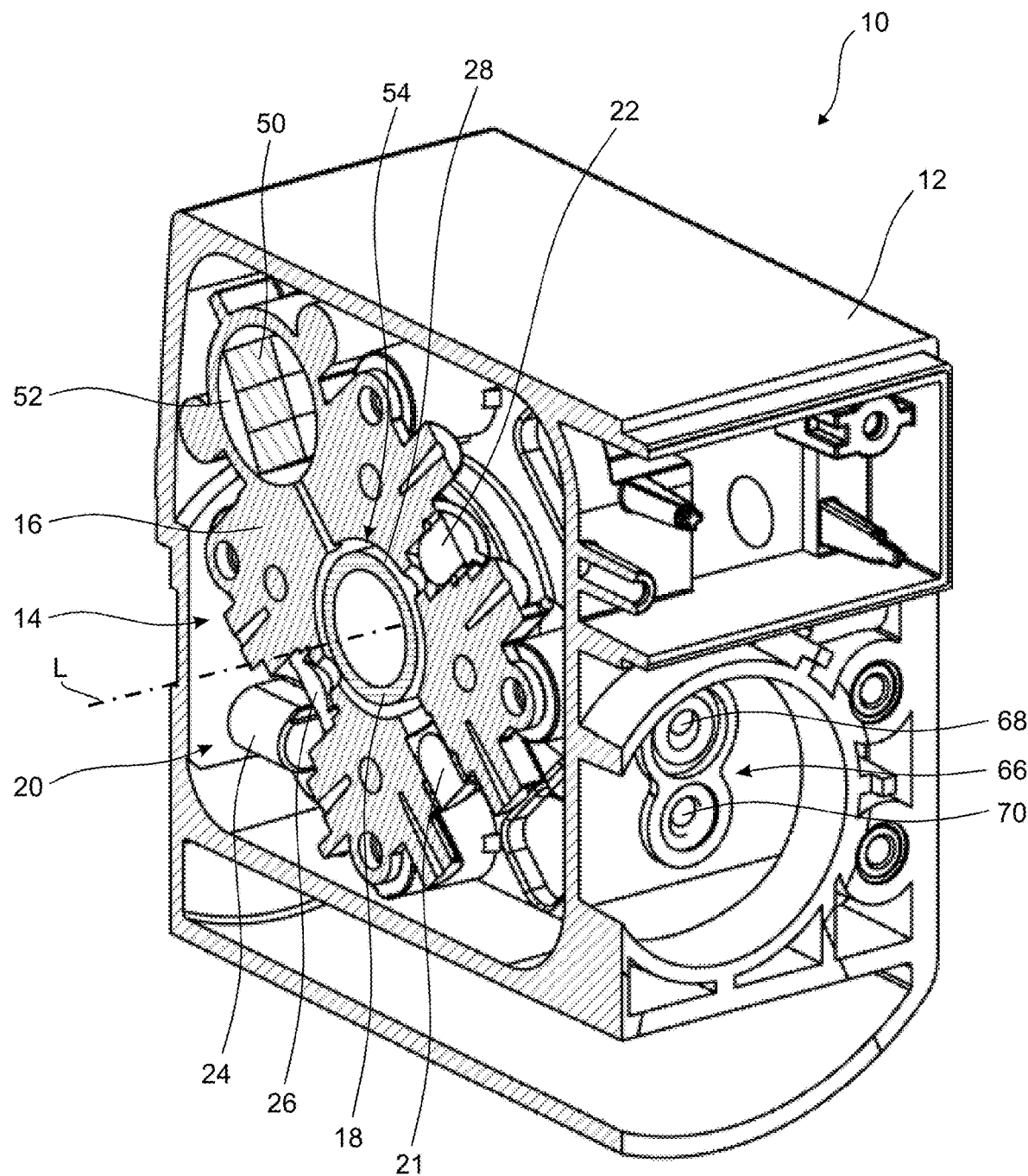
Figure 3:
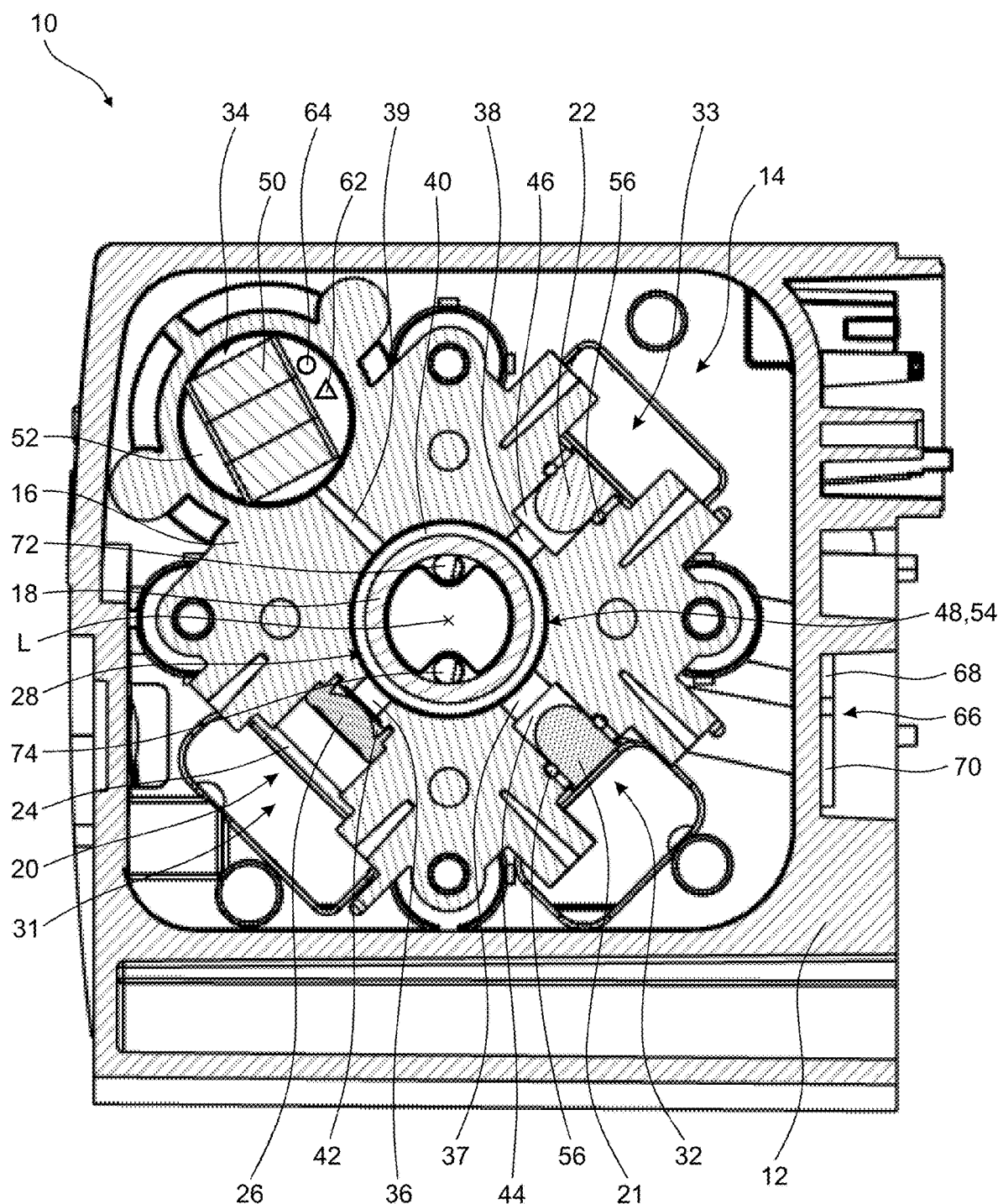

Further advantages and features will become apparent from the following description and from the accompanying drawings, in which:

FIG. 1 shows in a perspective view a turbidity sensor according to the invention with a closure element in an open position, FIG. 2 shows in a perspective sectional view a section of the turbidity sensor of FIG. 1, and FIG. 3 shows in a sectional view the turbidity sensor of FIG. 1.

FIG. 1 shows a turbidity sensor 10 having a housing 12 and a control unit 13.

The turbidity sensor 10 is set up to determine the turbidity value of a sample medium by means of the control unit 13.

To this end, the turbidity sensor 10 has a measuring means 14 (see FIG. 2) inside the housing 12 which includes an optics holder 16 for the measuring setup and a cuvette 18 for the sample medium.

The measuring means 14 is connected to the control unit 13 in a signal-transmitting manner.

The cuvette 18 is a cylindrical glass cuvette having a circular cross-section and extends along an axis L.

Here, the cuvette 18 has a cylindrical cavity in its interior in which the sample medium is received during a turbidity measurement or through which the sample medium is passed.

In principle, the cuvette 18 can be formed of any transparent material. Additionally or alternatively, the cuvette 18 may have any shape, in particular any cross-section.

The measuring means 14 further comprises a lighting means 20 as well as a first light sensor 21 and a second light sensor 22.

The lighting means 20 has a light source 24 for providing the radiation required for the turbidity measurement, and an optical lens 26 through which the radiation is guided to the sample medium.

The light source 24 is a laser having a wavelength in the infrared range, for example 860 nm.

In an alternative embodiment, any light source 24 suitable for turbidity measurements may of course be provided.

The optics holder 16 has a central receiving space 28 in which the cuvette 18 is received, and four surrounding receiving spaces 31, 32, 33, 34 which are each connected to the central receiving space 28 via a connecting duct 36, 37, 38, 39.

The central receiving space 28 extends along the axis L, which forms a longitudinal axis L of the central receiving space 28, and has a cross-section which is perpendicular to the longitudinal axis L and is configured complementarily to the cross-section of the cuvette 18 (see FIG. 3).

The cuvette 18 is arranged concentrically within the central receiving space 28, such that a circular intermediate space 40 is formed within the central receiving space 28 which extends completely around the cuvette 18 in a circumferential direction about the axis L.

In principle, the central receiving space 28 may be designed in any way, and the cuvette 18 may be arranged at any position in the central receiving space 28, an annular intermediate space being however preferably formed, which surrounds the cuvette 18 in an annular manner.

The lighting means 20 is arranged in the first receiving space 31 and, with the optical lens 26, adjoins a lighting chamber 42 which is directly fluidically connected to the central receiving space 28 via the first connecting duct 36.

The lighting chamber 42 is here formed by the region of the first receiving space 31 arranged between the first connecting duct 36 and the optical lens 26.

In an alternative embodiment, the lighting chamber 42 may be formed by any region which adjoins the optical lens 26 and which is arranged between the optical lens 26 and the cuvette 18, in particular a portion of the first connecting duct 36 or of the central receiving space 28.

The first light sensor 21 is arranged in the second receiving space 32 and adjoins a first sensor chamber 44, which is directly fluidically connected to the central receiving space 28 via the second connecting duct 37.

The first sensor chamber 44 is here defined by the region of the second receiving space 32 arranged between the second connecting duct 37 and the first light sensor 21.

In an alternative embodiment, the first sensor chamber 44 may be formed by any region which adjoins the first light sensor 21 and which is arranged between the first light sensor 21 and the cuvette 18, in particular a portion of the second connecting duct 37 or of the central receiving space 28.

The second light sensor 22 is arranged in the third receiving space 33 and adjoins a second sensor chamber 46, which is directly fluidically connected to the central receiving space 28 via the third connecting duct 38.

The second sensor chamber 46 is here formed by the region of the third receiving space 33 arranged between the third connecting duct 38 and the second light sensor 22.

In an alternative embodiment, the second sensor chamber 46 may be defined by any region which adjoins the second light sensor 22 and which is arranged between the second light sensor 22 and the cuvette 18, in particular a portion of the third connecting duct 38 or of the central receiving space 28.

The lighting chamber 42, the sensor chambers 44, 46 and the central receiving space 28 as well as the connecting ducts 36, 37, 38 connecting the central receiving space 28 to the lighting chamber 42 and the sensor chambers 44, 46 generate a optical path 48 of the measuring means 14 for the turbidity measurement.

The lighting means 20, the light sensors 21, 22, the cuvette 18, and the connecting ducts 36, 37, 38 connecting the central receiving space 28 to the lighting chamber 42 and the sensor chambers 44, 46 lie in a plane extending perpendicularly to the longitudinal axis L, or are intersected by this plane.

The second light sensor 22 is arranged opposite the lighting means 20 so as to form a straight measurement path for transmitted light measurements extending from the lighting means 20 through the cuvette 18 to the second light sensor 22.

The first light sensor 21 is arranged offset with respect to the lighting means 20 by an angle of rotation of 90° about the longitudinal axis L, so that a measuring path for scattered light measurements is formed which extends from the lighting means 20 through the cuvette 18 to the first light sensor 21, the section from the cuvette 18 to the first light sensor 21 being perpendicular to the straight measuring path.

To reduce or maintain low the air humidity in the optical path 48, the measuring means 14 includes a drying agent 50.

The drying agent 50 is arranged in the fourth receiving space 34, which thus forms a drying chamber 52 of the measuring means 14.

The volume of the fourth receiving space 34 is here larger than the drying means 50.

Furthermore, the drying agent 50 is preferably arranged in the receiving space 34 so as to be exposed on several sides and thus the surface of the drying agent 50 adjacent to the air is particularly large.

The fourth receiving space 34 is directly fluidically connected to the central receiving space 28 via the fourth connecting duct 39.

The fourth connecting duct 39 represents here the only connection via which the drying chamber 52 is fluidically connected to the optical path 48.

In principle, the drying chamber 52 can be connected to the optical path 48 via additional connecting ducts.

However, the drying chamber 52 is fluidically connected to the lighting chamber 42 and the sensor chambers 44, 46 via the intermediate space 40, so that further connecting ducts are not required.

It is in particular not necessary for the drying chamber 52 to be part of a circulation system through which air can circulate.

The drying chamber 52 is arranged offset from the lighting means 20 by an angle of rotation of 90° about the longitudinal axis L, opposite the first light sensor 21.

Furthermore, the drying chamber 52 and the fourth connecting duct 39 lie in the same plane which also intersects the lighting means 20, the light sensors 21, 22, the cuvette 18 and those connecting ducts 36, 37, 38 which connect the central receiving space 28 to the lighting chamber 42 and the sensor chambers 44, 46.

In principle, the drying chamber 52 may however be provided at any location in the optics holder 16 and can be fluidically connected to the optical path 48 in any manner.

The drying chamber 52 forms a chamber system 54 together with the central receiving space 28, the lighting chamber 42, the sensor chambers 44, 46 and the connecting ducts 36, 37, 38, 39.

Here, each region of the chamber system 54 is fluidically connected to all other regions of the chamber system 54. That is, the chamber system 54 comprises a single contiguous volume.

The chamber system 54 may be filled with air at atmospheric pressure. A vacuum means is in particular therefore not necessary for operation.

Furthermore, the chamber system 54 is designed as a passive drying system and thus without a driven pump which actively circulates the air in the chamber system 54 by actively moving parts of the pump via a drive.

The chamber system 54 is preferably a system which is closed in an airtight manner to the outside.

In order to ensure a high degree of tightness of the chamber system 54, the measuring means 14 has sealing elements 56, each of which is arranged between the light sensors 21, 22 and the optics holder 16 and thus seals the sensor chambers 44, 46 from the outside.

Similarly, the lighting chamber 42 may be sealed by means of a sealing element 56, for example with a sealing element that is arranged between the optical lens 26 and the optics holder 16.

Furthermore, the housing 12 has a maintenance access 58 (see FIG. 1) which constitutes a direct access to the drying chamber 52 and via which the drying agent 50 can be replaced.

In order to close the maintenance access 58, the turbidity sensor 10 has a closure element 60 in the form of a cover which can be attached and removed using a tool such as a screwdriver.

In an alternative embodiment, the closure element 60 can of course be of any design, for example include a lever by means of which the closure element 60 can be removed without tools and with little effort.

The drying agent 50 is, for example, a polymer or a substrate.

Preferably, the drying agent 50 is designed as a compact block that is particularly easy to handle and thus replaceable with little effort, in particular without tools.

Preferably, the maintenance access 58 can be closed in an airtight manner with respect to the environment by means of the closure element 60, for example by means of a suitably designed seal.

In particular, the drying chamber 52 is here connected to the maintenance access 58 in an airtight manner, so that it is reliably ensured that no air can flow into the chamber system 54 from the outside.

Adjacent to the drying chamber 52, the turbidity sensor 10 has a temperature sensor 62 and an air humidity sensor 64 by means of which the temperature and the air humidity in the drying chamber 52 can be measured.

The temperature sensor 62 and the air humidity sensor 64 are connected to the control unit 13 in a signal-transmitting manner.

Additionally or alternatively, the turbidity sensor 10 may include one or more temperature sensors 62 and/or one or more air humidity sensors 64 at any location, particularly adjacent to the chamber system 54, to measure the temperature and/or the air humidity in the chamber system 54.

The turbidity sensor 10 is set up for turbidity measurement in a continuous flow process and, for this purpose, has a media connection 66 including an inlet 68 and an outlet 70.

The inlet 68 is connected to a media inlet 72 (see FIG. 3) of the cuvette 18 and the outlet 70 is connected to a media outlet 74 of the cuvette 18, so that sample medium can flow continuously into the cuvette 18 by means of the inlet 68 via the media inlet 72 and out of the cuvette via the media outlet 74 at the outlet 70.

The cuvette 18 is here designed as a tubular section, the media inlet 72 opening directly into the interior of the tubular section, so that the sample medium is directed directly into the cylindrical cavity of the cuvette 18.

Furthermore, the media outlet 74 is directly adjacent to the interior of the tubular section such that the sample media is directly directed out of the cylindrical cavity of the cuvette 18 via the media outlet 74.

In an alternative embodiment, the turbidity sensor 10 can in principle be set up for any turbidity measurement process.

During a turbidity measurement, the sample medium in the cuvette 18 is irradiated by the lighting means 20, and the transmitted portion of the light is detected by the second light sensor 22, while the first light sensor 21 detects a portion of the scattered light.

Depending on the luminous flux emitted by the light source 24, the control unit 13 determines the turbidity value of the sample medium in the cuvette 18 on the basis of the luminous flux measured by the light sensors 21, 22.

The drying means 50 ensures here that the cuvette 18, the optical lens 26 and the light sensors 21, 22 do not fog up due to air humidity and thus impair the measurement results.

Due to the fact that the drying chamber 52 is passively connected to the optical path 48, the turbidity sensor 10 is particularly energy-saving, as no pump has to be driven for air circulation.

Furthermore, this design makes the turbidity sensor 10 particularly compact.

The invention is not limited to the embodiment shown. In particular, individual features of one embodiment may be combined as desired with features of other embodiments, in particular independently of the other features of the corresponding embodiments.

In an alternative embodiment, the turbidity sensor 10 may for example comprise only a single light sensor 21, 22. In this case, the receiving space, the sensor chamber and the connecting duct would accordingly be omitted, resulting in a correspondingly smaller optical path 48 and chamber system 54.

Alternatively, in a further embodiment, the turbidity sensor 10 may comprise more than two light sensors 21, 22.

In all embodiments, the connecting ducts 36, 37, 38, 39 are furthermore optional. That is, in an alternative embodiment, the lighting chamber 42, the first sensor chamber 44, the second sensor chamber 46, and/or the drying chamber 52 may be directly adjacent to the central receiving space 28.

The invention claimed is:

1. A turbidity sensor having a housing, a cuvette for a sample medium, a lighting source, a first light sensor, a drying agent and a chamber system,
    the chamber system having a central receiving space in which the cuvette is arranged, a lighting chamber adjoined by the lighting source, at least a first sensor chamber adjoined by the first light sensor, and a drying chamber in which the drying agent is arranged,
    the lighting chamber, the at least first sensor chamber and the drying chamber being each fluidically connected to the central receiving space,
    wherein the chamber system is configured as a passive, pump-free system.

2. The turbidity sensor according to claim 1, wherein the lighting chamber, the at least first sensor chamber and the drying chamber are each directly fluidically connected to the central receiving space by a separate connecting duct.

3. The turbidity sensor according to claim 1, wherein the drying chamber is fluidically connected to the central receiving space via one single connecting duct.

4. The turbidity sensor according to claim 3, wherein the connecting duct which fluidically connects the drying chamber to the central receiving space forms the generally only fluidic connection to the drying chamber.

5. The turbidity sensor according to claim 1, wherein an annular intermediate space which annularly surrounds the cuvette and via which the lighting chamber and the at least one sensor chamber are fluidically connected to the drying chamber is formed in the central receiving space.

6. The turbidity sensor according to claim 1, wherein the central receiving space has a longitudinal axis (L), a plane which is perpendicular to the longitudinal axis (L) intersecting the central receiving space, the lighting chamber, the at least one sensor chamber and the drying chamber.

7. The turbidity sensor according to claim 1, wherein the chamber system has a second sensor chamber which includes a second light sensor and is fluidically connected to the central receiving space.

8. The turbidity sensor according to claim 1, wherein the chambers are closed to the outside in an airtight manner in the housing.

9. The turbidity sensor according to claim 1, wherein the housing has a maintenance access to the drying chamber which is configured for replacing the drying agent in the drying chamber, and wherein the turbidity sensor has a closure element by which the maintenance access is adapted to be closed, in particular in an airtight manner.

10. The turbidity sensor according to claim 1, wherein the turbidity sensor has a temperature sensor and/or an air humidity sensor which adjoin the drying chamber and/or are received in the drying chamber at least in sections.

* * * * *